(12) United States Patent
Chen (10) Patent No.: US 11,778,166 B2
(45) Date of Patent: Oct. 3, 2023

(54) STEREOSCOPIC DISPLAY DEVICE AND DISPLAY METHOD THEREOF

(71) Applicant: Acer Incorporated, New Taipei City (TW)

(72) Inventor: Jui-Lin Chen, New Taipei (TW)

(73) Assignee: Acer Incorporated, New Taipei City (TW)

( * ) Notice: Subject to any disclaimer, the term of this patent is extended or adjusted under 35 U.S.C. 154(b) by 0 days.

(21) Appl. No.: 17/528,136

(22) Filed: Nov. 16, 2021

(65) Prior Publication Data

US 2023/0093023 A1 Mar. 23, 2023

(30) Foreign Application Priority Data

Sep. 22, 2021 (TW) ................................. 110135049

(51) Int. Cl.
*G06T 7/00* (2017.01)
*H04N 13/383* (2018.01)

(52) U.S. Cl.
CPC .................................. *H04N 13/383* (2018.05)

(58) Field of Classification Search
CPC ...... H04N 13/383; G06F 3/0346; G06F 3/016; G06F 3/011; G06F 1/163; G02B 2027/0187; G02B 2027/014; G02B 2027/0138
See application file for complete search history.

(56) References Cited

U.S. PATENT DOCUMENTS

| 6,064,424 A | 5/2000 | van Berkel et al. |
| 10,855,976 B2* | 12/2020 | Shin et al. ............ H04N 13/305 |
| 2007/0182812 A1* | 8/2007 | Ritchey ............. H04N 21/4305 348/36 |
| 2010/0020201 A1* | 1/2010 | Chao et al. ........... G06T 3/4038 348/E5.022 |
| 2014/0218291 A1* | 8/2014 | Kirk ........................ G06T 7/70 345/158 |
| 2015/0097938 A1* | 4/2015 | Tsou et al. ............. G06V 40/19 348/78 |
| 2015/0268477 A1* | 9/2015 | Ge et al. ................ G02B 30/31 349/15 |

(Continued)

FOREIGN PATENT DOCUMENTS

| CN | 101799584 A | 8/2010 |
| CN | 103018915 A | 4/2013 |
| CN | 111273457 A | 6/2020 |

(Continued)

*Primary Examiner* — Gims S Philippe
(74) *Attorney, Agent, or Firm* — JCIPRNET (57) ABSTRACT

A stereoscopic display device and a display method thereof are provided. The stereoscopic display device includes a display panel, a lens array, an image sensor, and a processing circuit. The display panel displays a three-dimensional image. The lens array is disposed on a transmission path of the three-dimensional image. The image sensor acquires a sensed image of a viewing field of the display panel. The processing circuit is coupled to the lens array and the image sensor. The processing circuit calculates an actual eye position of a user in the viewing field according to reference coordinates of a reference position in the sensed image and eye coordinates of the user in the sensed image. The processing circuit adjusts a liquid crystal rotation angle of the lens array according to the actual eye position, so that a viewing position of the three-dimensional image matches the actual eye position.

16 Claims, 8 Drawing Sheets

(56) References Cited

U.S. PATENT DOCUMENTS

| | | | |
|---|---|---|---|
| 2017/0111558 A1* | 4/2017 | Brueckner et al. | H04N 17/002 |
| 2017/0171540 A1 | 6/2017 | Li et al. | |
| 2017/0186234 A1* | 6/2017 | Xu | G06T 7/60 |
| 2020/0257183 A1* | 8/2020 | Ito et al. | G03B 13/36 |
| 2021/0279949 A1* | 9/2021 | Cao et al. | G06T 7/55 |
| 2022/0146856 A1* | 5/2022 | Hicks et al. | G02B 27/0172 |
| 2022/0321867 A1* | 10/2022 | Makinen et al. | H04N 13/317 |

FOREIGN PATENT DOCUMENTS

| | | | |
|---|---|---|---|
| TW | 201303367 A | 1/2013 | |
| TW | 201326902 A | 7/2013 | |
| TW | 201534102 A | 9/2015 | |
| TW | I559105 B | 11/2016 | |

\* cited by examiner

STEREOSCOPIC DISPLAY DEVICE AND DISPLAY METHOD THEREOF

CROSS-REFERENCE TO RELATED APPLICATION

This application claims the priority benefit of Taiwan application serial no. 110135049, filed on Sep. 22, 2021. The entirety of the above-mentioned patent application is hereby incorporated by reference herein and made a part of this specification.

BACKGROUND OF THE INVENTION

Field of the Invention

The invention relates to a stereoscopic display device, and more particularly to a stereoscopic display device and a display method thereof that may adjust the lens rotation angle.

Description of Related Art

Today's stereoscopic display techniques may be divided into glasses-type stereoscopic display techniques that require the observer to wear specially-designed glasses, and naked-eye stereoscopic display techniques in which viewing may be directly performed with the naked eye. Naked-eye stereoscopic display techniques may be divided into stereoscopic display techniques such as parallax barriers, lenticular lens, and directional backlight. In particular, the lenticular lens stereoscopic imaging method is to dispose a series of straight cylindrical convex lens thin films in front of the display screen. The direction of travel of the light may be changed when the light passes through the lenticular lens. The left-eye image and the right-eye image respectively correspond to the positions of the lenticular lens and are arranged longitudinally in a staggered manner. Via lens refraction, the left and right eyes of the user respectively see the corresponding left-eye image picture and the right-eye image picture to generate parallax, thereby presenting a stereoscopic effect.

However, the general lenticular lens is arranged in a single direction and fixedly attached to the surface of the display screen, or liquid crystal is injected into the lenticular lens to control the angle of refraction of the lens. However, at most, only the refraction in the horizontal direction of the user's horizontal position may be adjusted. Therefore, when the display screen has an excessively large inclination angle for the user, or the vertical viewing angle of the display screen is too large due to the user's own height, sitting posture, or other factors, the stereoscopic rendering effect of the display image may be significantly reduced, and visual deviation of the stereoscopic image or inability to form a stereoscopic effect may even occur, thus affecting user experience.

SUMMARY OF THE INVENTION

Accordingly, the invention provides a stereoscopic display device and a display method thereof that may dynamically adjust the liquid crystal rotation angle of the lens array according to the actual eye position to maintain the rendering effect of the stereoscopic image.

In an embodiment of the invention, a stereoscopic display device includes a display panel, a lens array, an image sensor, and a processing circuit. The display panel is configured to display a three-dimensional image. The lens array is disposed on a transmission path of the three-dimensional image. The image sensor is configured to acquire a sensed image of a viewing field of the display panel. The processing circuit is coupled to the lens array and the image sensor. The processing circuit calculates an actual eye position of a user in the viewing field according to reference coordinates of a reference position in the sensed image and eye coordinates of the user in the sensed image. The processing circuit adjusts a liquid crystal rotation angle of the lens array according to the actual eye position, so that a viewing position of the three-dimensional image matches the actual eye position.

In an embodiment of the invention, a display method of a stereoscopic display device includes: displaying a three-dimensional image via a display panel of the stereoscopic display device; disposing a lens array of the stereoscopic display device on a transmission path of the three-dimensional image; acquiring a sensed image of a viewing field of the display panel via an image sensor of the stereoscopic display device; calculating an actual eye position of a user in the viewing field according to reference coordinates of a reference position in the sensed image and eye coordinates of the user in the sensed image via a processing circuit of the stereoscopic display device; and adjusting a liquid crystal rotation angle of the lens array according to the actual eye position via the processing circuit, so that a viewing position of the three-dimensional image matches the actual eye position.

Based on the above, the stereoscopic display device and the display method thereof of the embodiments of the invention may acquire the sensed image of the viewing field of the display panel via the image sensor, and calculate the actual eye position of the user in the viewing field according to the reference coordinates and the eye coordinates in the sensed image via the processing circuit, so as to adjust the liquid crystal rotation angle of the lens array according to the actual eye position. In this way, the viewing position of the three-dimensional image displayed by the display panel may match the actual eye position, so as to maintain the rendering effect of the three-dimensional image, thereby optimizing user experience.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

The term "coupled to (or connected to)" used in the entire text of the specification of the present application (including claims) may refer to any direct or indirect connecting means. For example, if the text describes a first device is coupled to (or connected to) a second device, then it should be understood that the first device may be directly connected to the second device, or the first device may be indirectly connected to the second device via other devices or certain connecting means. Terms such as "first" and "second" mentioned in the entire specification of the present application (including the claims) are used to name the elements or to distinguish different embodiments or ranges, and are not used to restrict the upper or lower limits of the number of elements, nor are they used to limit the order of the elements. Moreover, when applicable, elements/components/steps having the same reference numerals in figures and embodiments represent the same or similar parts. Elements/components/steps having the same reference numerals or having the same terminology in different embodiments may be cross-referenced.

Figure 1:
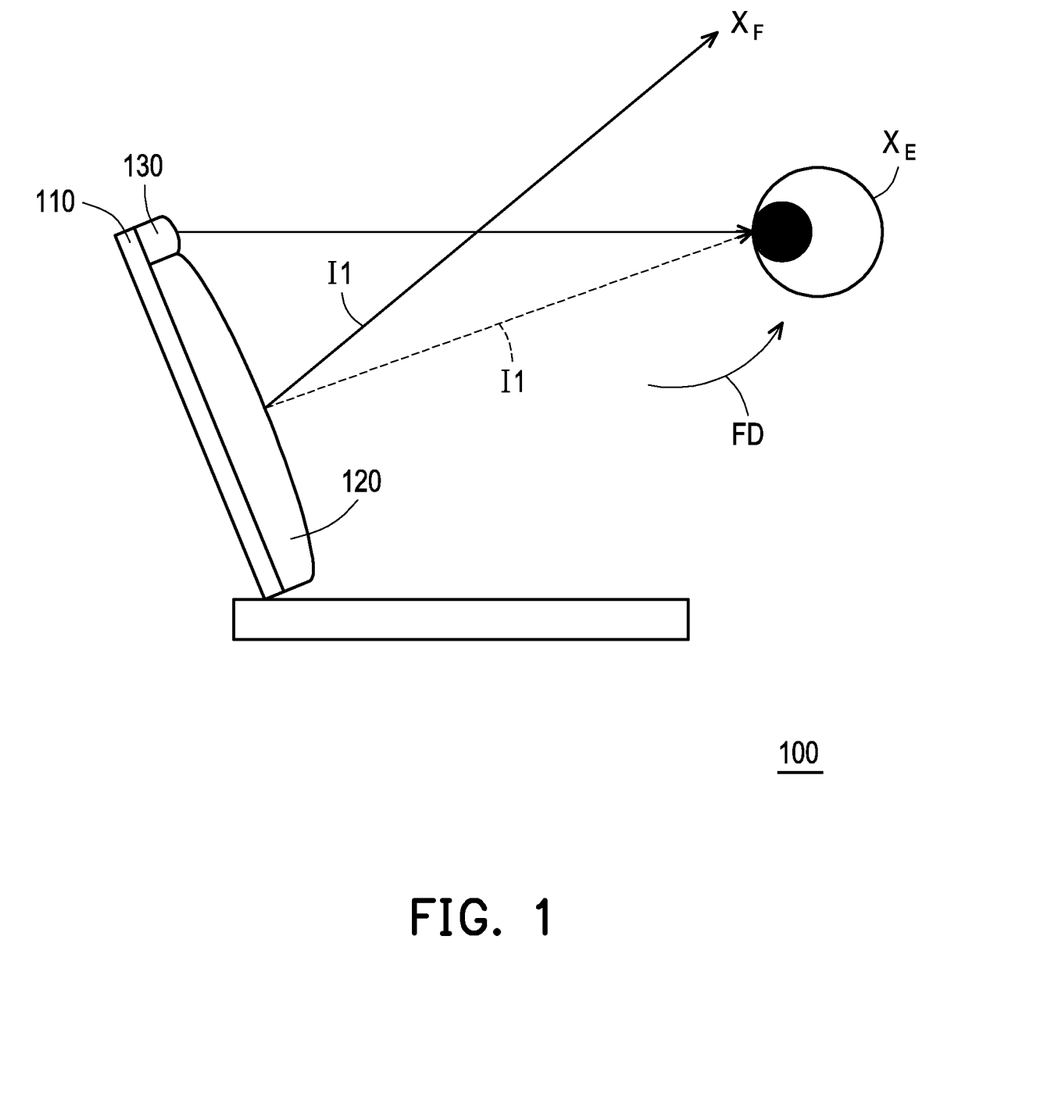
FIG. 1 is a schematic diagram of a use situation of a stereoscopic display device according to an embodiment of the invention.
Figure 2:
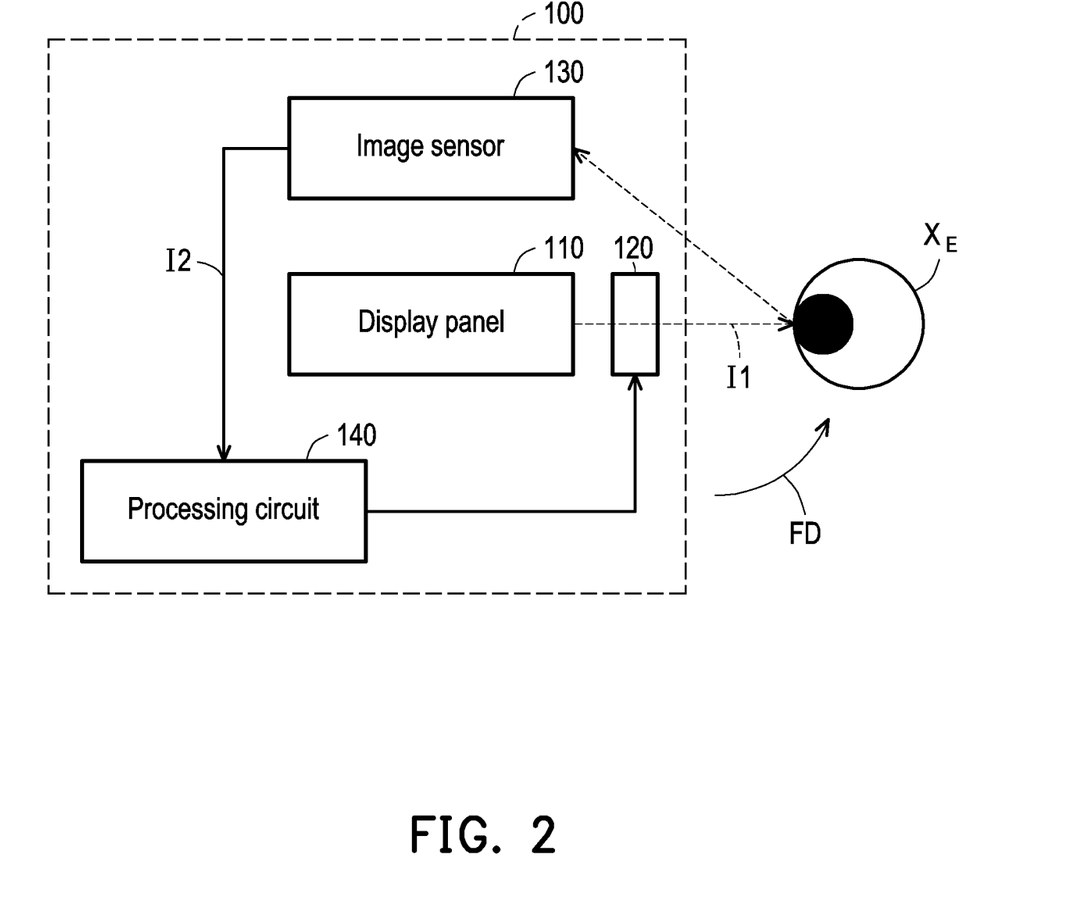
FIG. 2 is a schematic diagram of a circuit block of a stereoscopic display device according to an embodiment of the invention.

FIG. 1 is a schematic diagram of a use situation of a stereoscopic display device 100 according to an embodiment of the invention. FIG. 2 is a schematic diagram of a circuit block of the stereoscopic display device 100 according to an embodiment of the invention. Please refer to FIG. 1 and FIG. 2. In the embodiment shown in FIG. 1 and FIG. 2, the stereoscopic display device 100 includes a display panel 110, a lens array 120, an image sensor 130, and a processing circuit 140. The processing circuit 140 is coupled to the lens array 120 and the image sensor 130. According to actual application, the type of the display panel 110 may be a liquid crystal display (LCD), a light-emitting diode (LED) display, a field-emission display (FED), an organic light-emitting diode (OLED), an active-matrix organic light-emitting diode (AMOLED) display, a flexible display, a transparent light-emitting diode display, or other display units that provide display functions.

The display panel 110 may display a three-dimensional video I1 to a viewing field FD. The lens array 120 is disposed on a transmission path of the three-dimensional image I1. In some embodiments, the lens array 120 may be directly in contact with or attached to the display panel 110 to simplify manufacturing process or optimize optical effect, and the present embodiment is not limited in this regard.

According to design requirements, the related functions of the processing circuit 140 may be implemented as hardware using a hardware description language such as Verilog HDL or VHDL or other suitable programming languages. For example, the related functions of the processing circuit 140 may be implemented in one or a plurality of microcontrollers, microprocessors, application-specific integrated circuits (ASICs), digital signal processors (DSPs), field-programmable gate arrays (FPGAs), and/or various logic blocks, modules, and circuits in other processing units. In software form and/or firmware form, the related functions of the processing circuit 140 may be implemented as programming codes. For example, the above may be implemented using a general programming language (such as C, C++, or a combination language) or other suitable programming languages. The programming code may be recorded/stored in a "non-transitory computer-readable medium". Examples include read-only memory (ROM), tape, disk, card, semiconductor memory, programmable logic circuit, and/or storage device. A central processing unit (CPU), a microcontroller, or a microprocessor may read and execute the programming codes from the non-transitory computer-readable medium to achieve a related function. The storage unit 130 is, for example, any type of random-access memory (RAM), read-only memory (ROM), flash memory, hard disk drive, other similar devices, or a combination of the devices.

Figure 3:
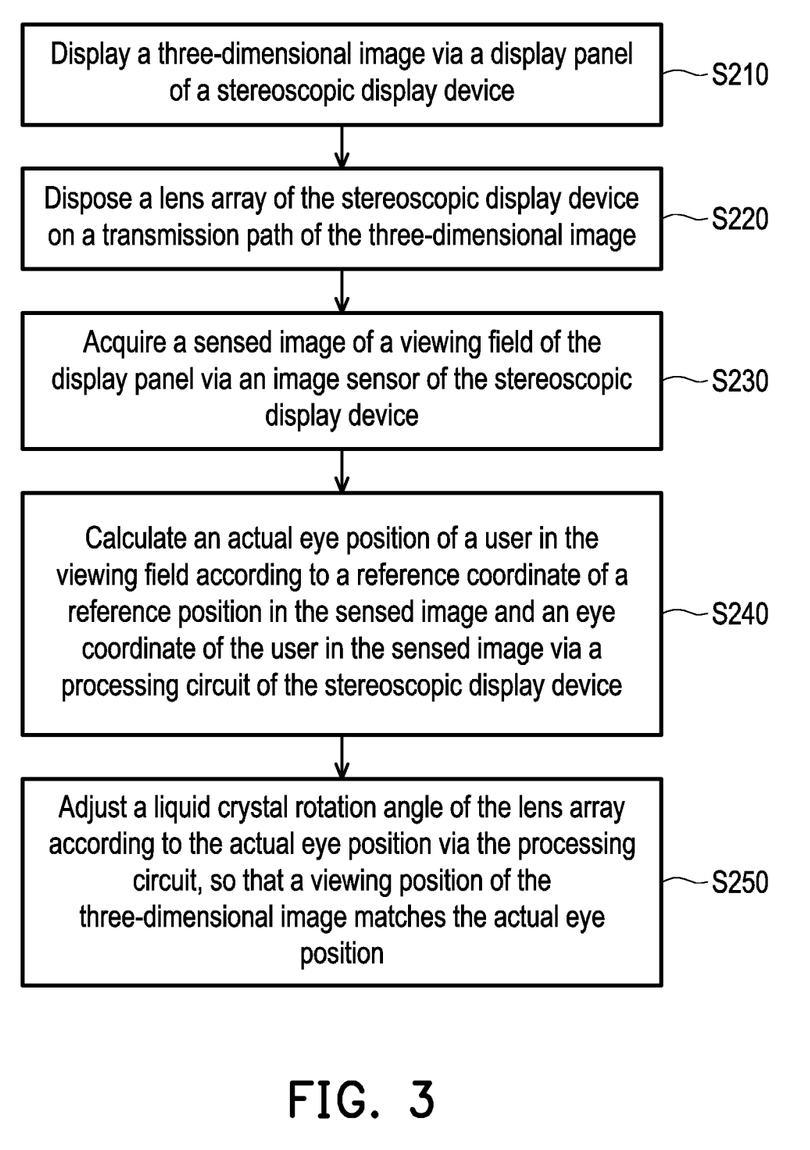
FIG. 3 is a flowchart of a display method of a stereoscopic display device according to an embodiment of the invention.

FIG. 3 is a schematic flowchart of a display method of a stereoscopic display device according to an embodiment of the invention. For the stereoscopic display device 100 shown in FIG. 1 and FIG. 2, reference may be made to the related description of FIG. 3. Please refer to all of FIG. 1, FIG. 2, and FIG. 3. In step S210, the display panel 110 may display the three-dimensional image I1 to project the three-dimensional image I1 to the viewing field FD. In step S220, the lens array 120 of the stereoscopic display device 100 may be disposed on the transmission path of the three-dimensional image I1.

Specifically, the viewing field FD shown in FIG. 1 includes a default viewing position $X_F$ and an actual eye position $X_E$ of a user. The actual eye position $X_E$ may be the same as or different from the default viewing position $X_F$. It should be mentioned that, in the present embodiment, each lens in the lens array 120 is filled with liquid crystal, wherein the liquid crystal rotation angle may be controlled to change the focusing characteristics of the lens, thereby changing the angle of refraction of light passing through the lens. In the present embodiment, assuming that the liquid crystal rotation angle of the lens array 120 is the preset initial angle, the viewing position (ideal position) of the three-dimensional image I1 displayed by the display panel 110 is the default viewing position $X_F$ in the viewing field FD. According to actual design, in some embodiments, the default viewing position $X_F$ may be located on the normal vector at the center of the display panel 110, but is not limited thereto in other embodiments.

In step S230, the image sensor 130 may acquire a sensed image I2 of the viewing field FD of the display panel 110 and transmit the sensed image I2 to the processing circuit 140. In step S240, the processing circuit 140 may identify the sensed image I2 to obtain the eye coordinates of the user in the sensed image I2. The default viewing position $X_F$ in the viewing field FD corresponds to the reference position in the sensed image I2. In the present embodiment, it is assumed that the reference position in the sensed image I2 includes the center position of the sensed image I2. However, in other embodiments, the reference position may be another position in the sensed image I2. The processing circuit 140 may calculate the actual eye position $X_E$ of the user in the viewing field FD according to the reference coordinates of a reference position in the sensed image I2 and the eye coordinates of the user in the sensed image I2 (step S240).

Figure 4:
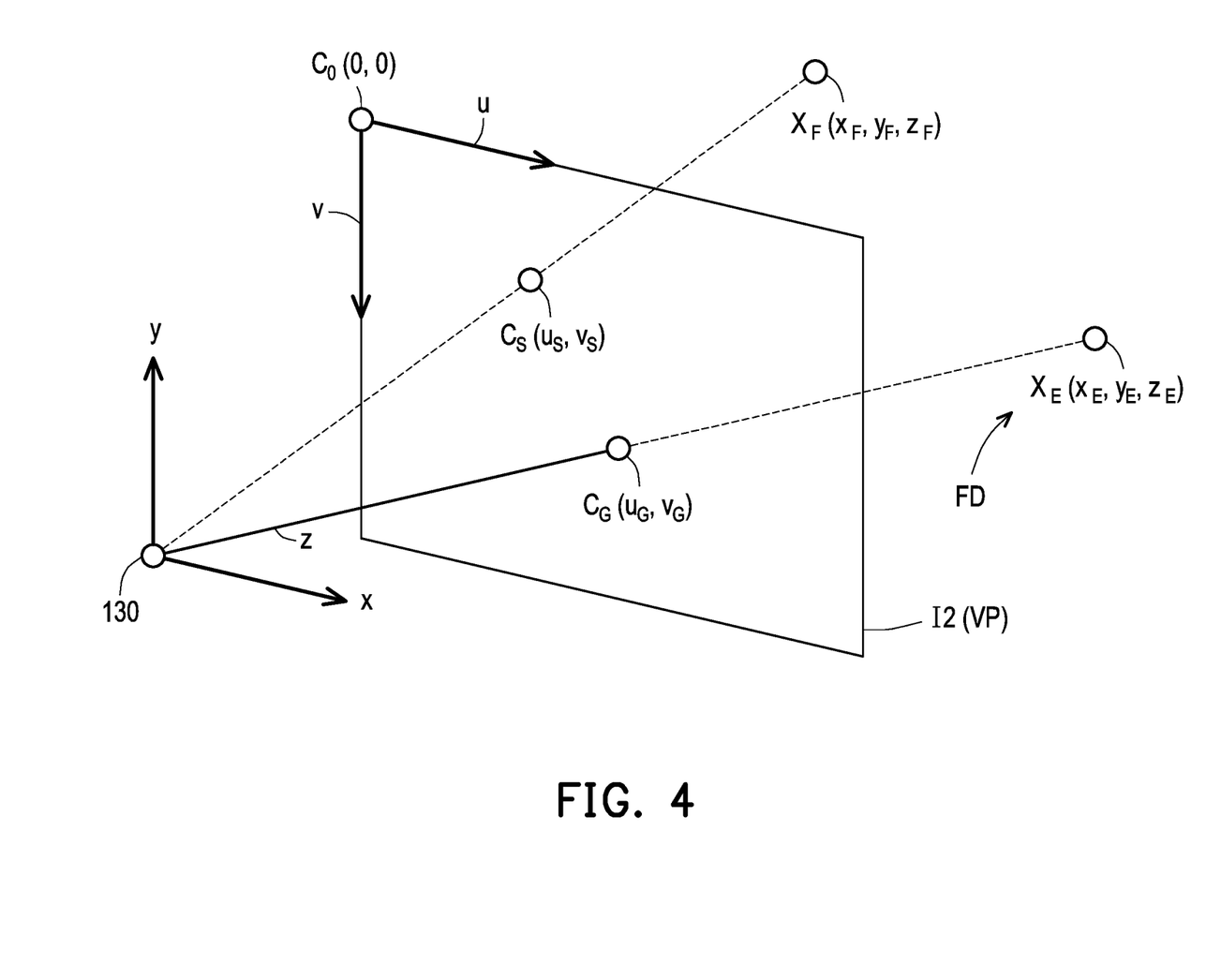
FIG. 4 is a schematic diagram of a sensing situation of a stereoscopic display device according to an embodiment of the invention.

For example, FIG. 4 is a schematic diagram of a sensing situation of the stereoscopic display device 100 according to an embodiment of the invention. In the embodiment shown in FIG. 4, it is assumed that in the x-y-z three-dimensional space of the viewing field FD, the image sensor 130 is used as a reference, the sensing direction of the image sensor 130 toward the user is defined as the z-axis, and the x-axis, the y-axis, and the z-axis are perpendicular to each other. The x-y-z three-dimensional coordinate of the default viewing position $X_F$ in the viewing field FD may be expressed as ($x_F$, $y_F$, $z_F$), and the x-y-z three-dimensional coordinate of the actual eye position $X_E$ in the viewing field FD may be expressed as ($x_E$, $y_E$, $z_E$).

In the present embodiment, the sensed image I2 of the viewing field FD acquired by the image sensor 130 may correspond to a virtual imaging plane VP where the focal length of the image sensor 130 is located. The image sensor 130 senses the actual eye position $X_E$ in the viewing field FD to obtain the sensed image I2. The imaging plane VP (the sensed image I2) is a u-v two-dimensional plane formed by the u-axis and the v-axis. An eye position $C_G$ in the imaging plane VP (the sensed image I2) corresponds to the actual eye position $X_E$ in the viewing field FD, and a reference position Cs in the imaging plane VP (the sensed image I2) corresponds to the default viewing position $X_F$ in the viewing field FD. On the imaging plane VP, origin coordinates $C_0$ (0, 0) are used as a reference, the coordinates of the reference position Cs are the reference coordinates (us, vs), and the coordinates of the eye position $C_G$ are the eye coordinates ($u_G$, $v_G$). In the embodiment shown in FIG. 4, the x-axis of the viewing field FD is parallel to the u-axis of the imaging plane VP, and the y-axis of the viewing field FD is parallel to the v-axis of the imaging plane VP. As a result, when the default viewing position $X_F$ in the viewing field FD is a preset default viewing position or a known position, the processing circuit 140 may calculate the actual eye position $X_E$ of the user in the viewing field FD according to the reference coordinates (us, vs) of the reference position Cs and the eye coordinates ($u_G$, $v_G$) of the eye position $C_G$ in the sensed image I2.

Figure 5:
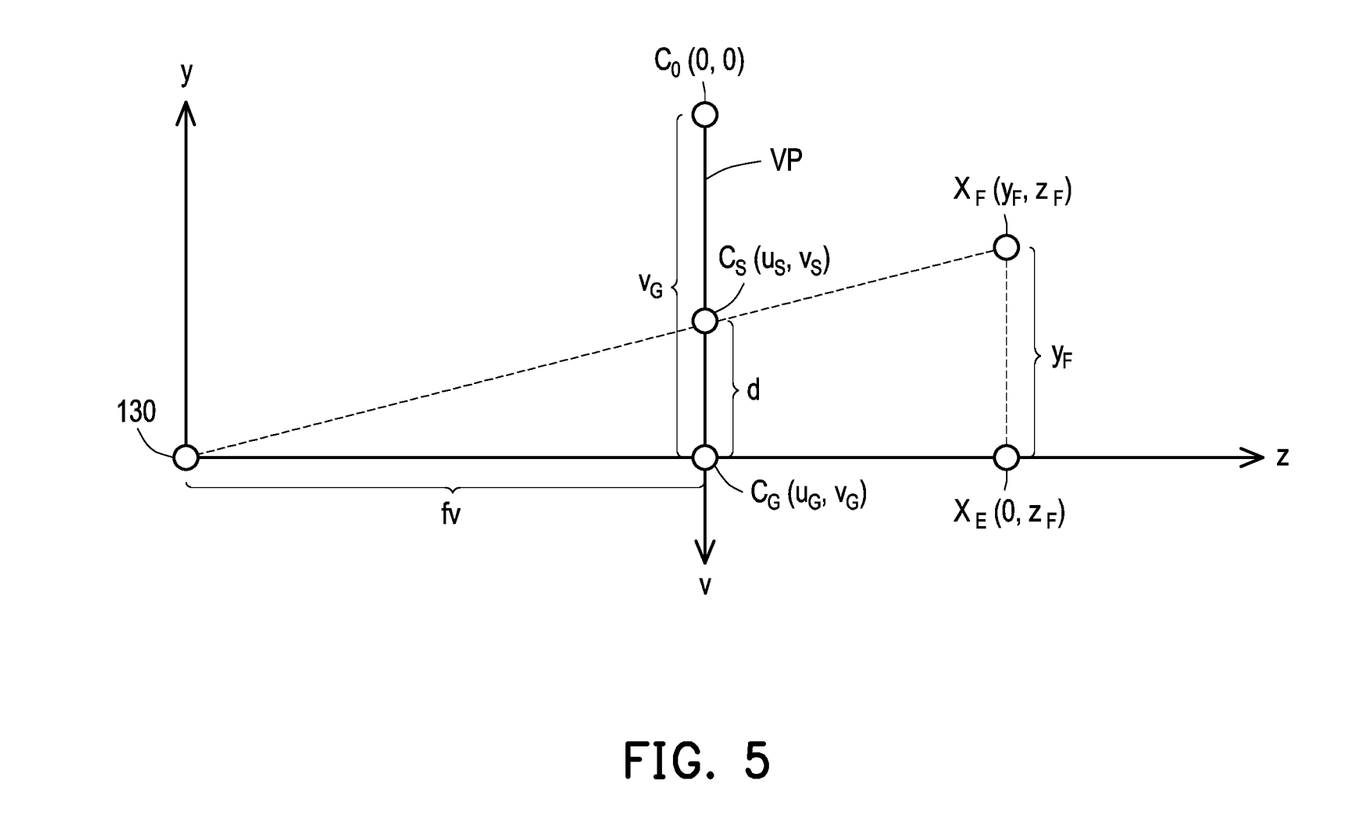
FIG. 5 is a schematic diagram illustrating the y-z plane of the sensing situation shown in FIG. 4 according to an embodiment of the invention.

For example, FIG. 5 is a schematic diagram illustrating the y-z plane of the sensing situation shown in FIG. 4 according to an embodiment of the invention. Please refer to FIG. 4 and FIG. 5 at the same time. In the embodiment shown in FIG. 5, it is assumed that the z-axis coordinate $z_E$ of the user in the viewing field FD (i.e., the actual eye position $X_E$) (the depth information from the display panel 110 to the eye) is equal to the z-axis coordinate $z_F$ of the default viewing position $X_F$ (the depth information from the display panel 110 to the default viewing position $X_F$). In the embodiment shown in FIG. 5, taking the image sensor 130 as a reference, the y-z two-dimensional coordinates of the default viewing position $X_F$ may be expressed as ($y_F$, $z_F$), the y-z two-dimensional coordinates of the actual eye position $X_E$ may be expressed as (0, $z_F$), and the relative distance between the default viewing position $X_F$ and the actual eye position $X_E$ on the y-axis is $y_F$. In this way, in the present embodiment, the relationship between the reference coordinates (us, vs) of the reference position Cs and the eye coordinates ($u_G$, $v_G$) of the eye position $C_G$ in the imaging plane VP may be expressed as follows:

$$\frac{f_v}{z_F} = \frac{d}{y_F} \rightarrow d = \frac{f_v y_F}{z_F} \quad (1)$$

$$C_s = \left( u_s, v_G - \frac{f_v y_F}{z_F} \right) \quad (2)$$

$$\Delta \text{Eyeball} = \left( \Delta x, v_G - \frac{f_v y_F}{z_F} \right) \quad (3)$$

In particular, d represents the relative distance (y-axis variable) between the reference position Cs and the eye position $C_G$ on the v-axis in the imaging plane VP. fv represents the imaging distance between the display panel 110 (the image sensor 130) and the imaging plane VP corresponding to the sensed image I2, is, the relative distance between the image sensor 130 and the eye postion $C_G$ on the z-axis (z-axis variable). Δx represents the relative distance between the actual eye position $X_E$ and the default viewing position $X_F$ on the x-axis (x-axis variable), and ΔEyeball represents the actual amount of variation between the actual eye position $X_E$ and the default viewing position $X_F$ on the x-y two-dimensional plane. In some embodiments, the processing circuit 140 may calculate the distance d via the reference coordinates (us, vs) of the reference position Cs and the eye coordinates ($u_G$, $v_G$) of the eye position $C_G$ in the sensed image I2. In some embodiments, the processing circuit 140 may calculate the imaging distance fv via the focal length of the image sensor 130. According to actual application, in some embodiments, the stereoscopic display device 100 may optionally include a depth sensor (not shown), and the depth sensor may sense a depth information $z_F$ from the display panel 110 to the user (the actual eye position $X_E$) in the viewing field FD. Therefore, in some embodiments, the processing circuit 140 may calculate the default viewing position $X_F$ corresponding to the reference position Cs in the viewing field FD using the depth information $z_F$ and the reference coordinates (us, vs) of the reference position Cs via the above relational expressions (1) to (3).

In step S250 shown in FIG. 3, the processing circuit 140 may adjust the liquid crystal rotation angle of the lens array 120 according to the actual eye position $X_E$, so that the viewing position (ideal position) of the three-dimensional image I1 matches the actual eye position $X_E$. It should be mentioned that, in the embodiments shown in FIG. 1 and FIG. 2, the processing circuit 140 may change the direction of light refraction by adjusting the liquid crystal rotation angle of the lens array 120, so that the viewing position of the three-dimensional image I1 may be moved from the default viewing position $X_F$ to the actual eye position $X_E$ (or, as close as possible to the actual eye position $X_E$). Taking the scenario shown in FIG. 4 as an example, the movement of the light (image) is only the movement of the three-dimensional image I1 on the u-v (or x-y) two-dimensional plane to the user's eyes. However, for the lens array 120 and the image sensor 130, the movement of the light (image) is a stereo conversion in the x-y-z three-dimensional space. Therefore, in some embodiments, the processing circuit 140 may preset or calculate a spatial transformation matrix for converting the u-v two-dimensional coordinates into x-y-z three-dimensional coordinates. The processing circuit 140 may convert the eye coordinates ($u_G$, $v_G$) of the eye position $C_G$ in the sensed image I2 into the coordinates ($x_E$, $y_E$, $z_E$) of the actual eye position $X_E$ using the spatial transformation matrix, and then adjust the liquid crystal rotation angle of the lens array 120 according to the coordinates ($x_E$, $y_E$, $z_E$) of the actual eye position $X_E$.

For example, in some embodiments, the spatial transformation matrix may be one or a plurality of fixed matrices that are preset before the stereoscopic display device 100 leaves the factory. Or, in some embodiments, the processing circuit 140 may also dynamically calculate the spatial transformation matrix according to the reference coordinates (us, vs) of the reference position Cs in the sensed image I2 and the coordinates ($x_F$, $y_F$, $z_F$) of the default viewing position $X_F$ corresponding to the reference position Cs in the viewing field FD. For example, in some embodiments, the relationship between the reference position Cs and the default viewing position $X_F$ may be expressed as follows:

$$C_s = K_F X_F \tag{4}$$

$$K_F\left(X_F^{\ t} \cdot X_F\right) = X_F^{\ t} \cdot C_s \cdot X_F^{-1} \tag{5}$$

$$K_F\left(X_F^{\ t} \cdot X_F\right)^{-1} \cdot \left(X_F^{\ t} \cdot X_F\right) = \left(X_F^{\ t} \cdot X_F\right)^{-1} \cdot C_s \tag{6}$$

$$K_F = \left(X_F^{\ t} \cdot X_F\right)^{-1} \cdot C_s \tag{7}$$

In particular, $K_F$ represents the spatial transformation matrix between the reference position Cs on the two-dimensional plane and the default viewing position $X_F$ in the three-dimensional space. In some embodiments, the reference position Cs may be a 2×1 matrix, the spatial transformation matrix $K_F$ may be a 2×3 matrix, and the default viewing position $X_F$ may be a 3×1 matrix. In some embodiments, the default viewing position $X_F$ is an irreversible non-square matrix, so the processing circuit 140 may solve the spatial transformation matrix $K_F$ via the least square method of the above formulas (5) to (7). Similarly, in some embodiments, the relationship between the eye position $C_G$ and the actual eye position $X_E$ may also be expressed as follows:

$$C_G = K_E X_E \tag{8}$$

In particular, $K_E$ represents the spatial transformation matrix between the eye position $C_G$ on the two-dimensional plane and the actual eye position $X_E$ in the three-dimensional space. In some embodiments, the eye position $C_G$ may be a 2×1 matrix, the spatial transformation matrix $K_E$ may be a 2×3 matrix, and the actual eye coordinates $X_E$ may be a 3×1 matrix. In some embodiments, the spatial transformation matrix $K_E$ may be equal to the spatial transformation matrix $K_F$. As a result, the processing circuit 140 may convert the eye coordinates $(u_G, v_G)$ of the eye position $C_G$ into the coordinates of the actual eye position $X_E$ ($x_E$, $y_E$, $z_E$) using the spatial transformation matrix $K_F$ calculated by the above formula (7) and then via formula (8).

Moreover, for the lens array 120 and the image sensor 130, the movement of the viewing position of the three-dimensional image I1 may be regarded as the coordinate conversion of the default viewing position $X_F$ in the three-dimensional space. Therefore, in some embodiments, the relationship between the default viewing position $X_F$ and the actual eye position $X_E$ may be expressed as follows:

$$X_E = R_F X_F + t \tag{9}$$

In particular, t represents the compensation vector between a plurality of lenses in the lens array 120. $R_F$ represents the rotation matrix when the coordinates of the default viewing position $X_F$ are converted in the three-dimensional space. In some embodiments, the actual eye position $X_E$ may be a 3×1 matrix, the rotation matrix $R_F$ may be a 3×3 matrix, the default viewing position $X_F$ may be a 3×1 matrix, and the compensation vector t may be a 3×1 matrix. As a result, when the compensation vector t approaches 0, the processing circuit 140 may substitute the default viewing position $X_F$ in the viewing field FD and the actual eye position $X_E$ calculated by the above formula (8) into the above formula (9) to calculate the rotation matrix $R_F$. Then, the processing circuit 140 may calculate the liquid crystal rotation angle of the lens array 120 according to the rotation matrix $R_F$.

In some other embodiments, the above formula (8) and formula (9) may also be combined into the following relational formula:

$$C_G = K_E(R_F X_F + t) \tag{10}$$

$$R_F = K_E^{-1} \cdot X_F^{\ t} \cdot \left(X_F^{\ t} X_F\right)^{-1} \cdot C_G \tag{11}$$

In some embodiments, assuming that the compensation vector t approaches 0 and the spatial transformation matrix $K_E$ is equal to the spatial transformation matrix $K_F$, the above formula (10) may be expressed as $C_G = K_F(R_F X_F)$. In other words, the processing circuit 140 may also calculate the rotation matrix $R_F$ according to the eye position $C_G$ in the sensed image I2 sensed by the image sensor 130, the default viewing position $X_F$ preset or calculated by the above formula (1), and the spatial transformation matrix $K_F$ calculated by the above formula (7). As a result, afterwards, as long as the image sensor 130 acquires the eye position $C_G$, the processing circuit 140 may calculate the rotation matrix $R_F$ directly via the above formulas (10) and (11), and obtain the liquid crystal rotation angle needed to rotate the lens array 120 according to the rotation matrix $R_F$.

Specifically, the action of coordinate conversion of three-dimensional coordinate points (such as the default viewing position $X_F$) in the x-y-z three-dimensional space may be disassembled into three-dimensional coordinate points to rotate the x-axis, y-axis, and z-axis respectively, and the rotation matrix $R_F$ thereof may be expressed as follows:

$$R_F = R_y(\theta_y) R_x(\theta_x) R_z(\theta_z) \tag{12}$$

$$R_x(\theta_x) = \begin{bmatrix} 1 & 0 & 0 \\ 0 & \cos\theta_x & -\sin\theta_x \\ 0 & \sin\theta_x & \cos\theta_x \end{bmatrix} \tag{13}$$

$$R_y(\theta_y) = \begin{bmatrix} \cos\theta_y & 0 & \sin\theta_y \\ 0 & 1 & 0 \\ -\sin\theta_y & 0 & \cos\theta_y \end{bmatrix} \tag{14}$$

$$R_z(\theta_z) = \begin{bmatrix} \cos\theta_z & -\sin\theta_z & 0 \\ \sin\theta_z & \cos\theta_z & 0 \\ 0 & 0 & 1 \end{bmatrix} \tag{15}$$

In particular, $R_x$, $R_y$, and $R_z$ respectively represent rotation matrices when the three-dimensional coordinate points independently rotate the x-axis, y-axis, and z-axis, and the rotation angles thereof are $\theta_x$, $\theta_y$, and $\theta_z$, respectively. In other words, in the case that the three-dimensional coordinate points independently rotate the x-axis, the coordinate conversion thereof only affects the y-z two-dimensional plane, that is, the y-z two-dimensional plane where the three-dimensional coordinate points are located rotates the x-axis. In the case that the three-dimensional coordinate points independently rotate the y-axis, the coordinate conversion thereof only affects the x-z two-dimensional plane, that is, the x-z two-dimensional plane where the three-dimensional coordinate points are located rotates the y-axis. In the case that the three-dimensional coordinate points independently rotate the z-axis, the coordinate conversion thereof only affects the x-y two-dimensional plane, that is, the x-y two-dimensional plane where the three-dimensional coordinate points are located rotates the z-axis.

Therefore, using the embodiment of FIG. 4 as an example, in the x-y-z three-dimensional space, for the lens array 120 (or the image sensor 130), the way of moving the viewing position of the three-dimensional image I1 from the default viewing position $X_F$ to the actual eye position $X_E$ may be regarded as rotating the z-axis via the x-y two-dimensional plane where the default viewing position $X_F$ is located. Then, the rotation matrix $R_F$ in the above formulas (9) to (11) may be expressed by the rotation matrix $R_Z$ ($\theta_Z$) in the above formula (15). In this way, after the processing circuit 140 calculates the rotation matrix $R_F$, the rotation angle $\theta_z$ when the default viewing position $X_F$ rotates the z-axis may be calculated according to the rotation matrix $R_Z(\theta_z)$. Further, the liquid crystal rotation angle in the lens array 120 is adjusted via the processing circuit 140 to change the direction of refraction of the passing light, so that the viewing position of the three-dimensional image I1 matches the actual eye position $X_E$, so as to maintain the rendering effect of the three-dimensional image.

Figure 6:
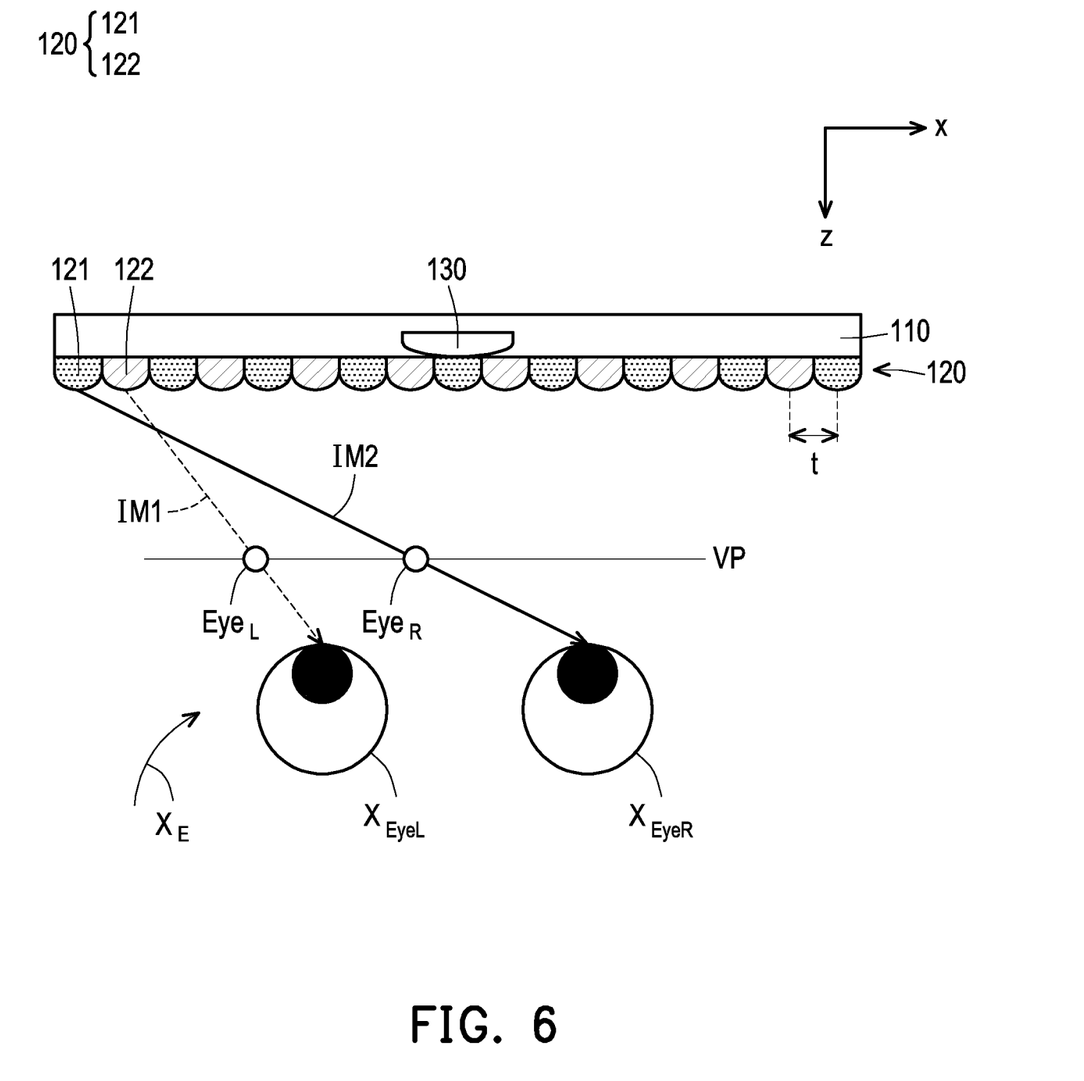
FIG. 6 is a schematic diagram illustrating a partial optical path of the stereoscopic display device shown in FIG. 1 and FIG. 2 according to an embodiment of the invention.

FIG. 6 is a schematic diagram illustrating a partial optical path of the stereoscopic display device 100 shown in FIG. 1 and FIG. 2 according to an embodiment of the invention. In the embodiment shown in FIG. 6, the display panel 110 may simultaneously present at least two sub-images configured to form a three-dimensional image, and the lens array 120 may include a plurality of lenses arranged in sequence to correspond to the plurality of sub-images, respectively, so as to respectively project a plurality of sub-images to the eyes of the user. In particular, the number, shape, and arrangement of the lenses in the lens array 120 may be adjusted according to actual need, and the present embodiment is not limited in these regards. For example, in the present embodiment, the three-dimensional image displayed by the display panel 110 may include a left parallax image IM1 and a right parallax image IM2. The lens array 120 may include a lens array 122 and a lens array 121 corresponding to the user's left eye $X_{EyeL}$ and right eye $X_{EyeR}$, respectively, so that the left parallax image IM1 and the right parallax image IM2 are respectively sent to the user's left eye $X_{EyeL}$ and right eye $X_{EyeR}$, and then a stereoscopic effect is rendered via the parallax. Corresponding to the actual eye position $X_E$ of the user (the left eye $X_{EyeL}$ and the right eye $X_{EyeR}$), the liquid crystal rotation angles of the lens arrays 121 and 122 need to be calculated separately.

Specifically, in the present embodiment, the image sensor 130 may sense the user's left eye $X_{EyeL}$ and/or right eye $X_{EyeR}$ to generate a sensed image, and the imaging plane VP corresponding to the sensed image may include left eye coordinates $Eye_L$ and/or right eye coordinates $Eye_R$ corresponding to the user's left eye $X_{EyeL}$ and/or right eye $X_{EyeR}$. Then, in some embodiments, assuming that the actual position of the left eye $X_{EyeL}$ is used as a reference, the above formula (9) may be rewritten as follows:

$$Eye_R = K_E \left( R_{EL} X_{EyeL} \right) \quad (16)$$

$$Eye_L = K_E \left( R_{ER} X_{EyeR} + t \right) \quad (17)$$

In the present embodiment, the compensation vector t may be related to the horizontal resolution of the display panel 110. For example, taking the display panel 110 with a resolution of 1920*1080 pixels as an example, the compensation vector t may be a spacing of 0.17925 mm between horizontal pixels, then in the x-y-z three-dimensional space, the compensation vector t may be expressed as a 3×1 matrix $\begin{bmatrix} 0.17925 \\ 0 \\ 0 \end{bmatrix}$. $R_{EL}$ and $R_{ER}$ indicate the rotation matrices of the lens arrays 121 and 122, respectively. In the present embodiment, it is assumed that the lens array 121 and the lens array 122 are sequentially arranged along the x-axis horizontal direction, and the direction in which the display panel 110 displays images via the lens array 120 is the z-axis. The processing circuit 140 may calculate the rotation matrices $R_{EL}$ and $R_{ER}$ corresponding to the lens arrays 121 and 122 according to the actual eye position $X_E$ (the left eye $X_{EyeL}$ or the right eye $X_{EyeR}$) and the compensation vector t via the above formulas (16) and (17). The processing circuit 140 may then calculate the rotation angle $\theta_z$ in the rotation matrices $R_{EL}$ and $R_{ER}$ according to the rotation matrix $R_z(\theta_z)$ independently rotating the z-axis in the above formula (15). As a result, the liquid crystal rotation angle of the lens array 121 and the liquid crystal rotation angle of the lens array 122 may be adjusted separately.

Figure 7:
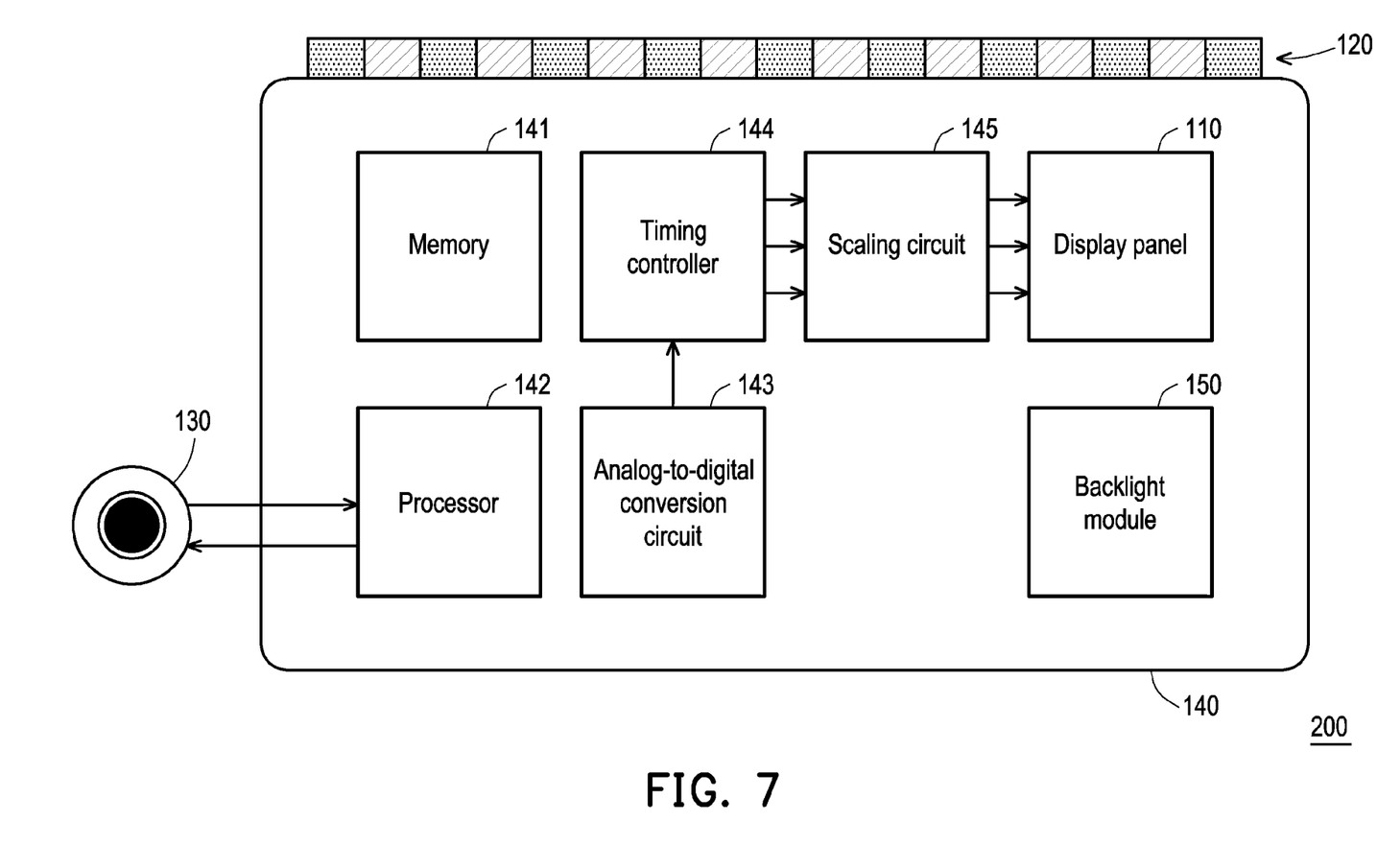
FIG. 7 is a schematic diagram of the hardware architecture of a stereoscopic display device according to another embodiment of the invention.

FIG. 7 is a schematic diagram of the hardware architecture of a stereoscopic display device 200 according to another embodiment of the invention. In the embodiment shown in FIG. 7, the stereoscopic display device 200 includes the display panel 110, the lens array 120, the image sensor 130, and the processing circuit 140. In particular, the implementation of the display panel 110, the lens array 120, and the image sensor 130 may be analogized with reference to the related descriptions of the display panel 110, the lens array 120, and the image sensor 130 shown in FIG. 1 and FIG. 2, and is therefore not repeated herein. In some embodiments, the processing circuit 140 may include a memory 141, a processor 142, an analog-to-digital conversion circuit 143, a timing controller 144, and/or a scaling circuit 145. In particular, the implementation of the processor 142 may be analogized with reference to the relevant description of the processing circuit 140 shown in FIG. 1 and FIG. 2. In some embodiments, the stereoscopic display device 200 may further include a backlight module 150. In particular, the embodiments of the memory 141, the analog-to-digital conversion circuit 143, the timing controller 144, the scaling circuit 145, and the backlight module 150 may be constructed by an image display device known to those with ordinary skill in the art, and the present embodiment is not limited in this regard.

Figure 8:
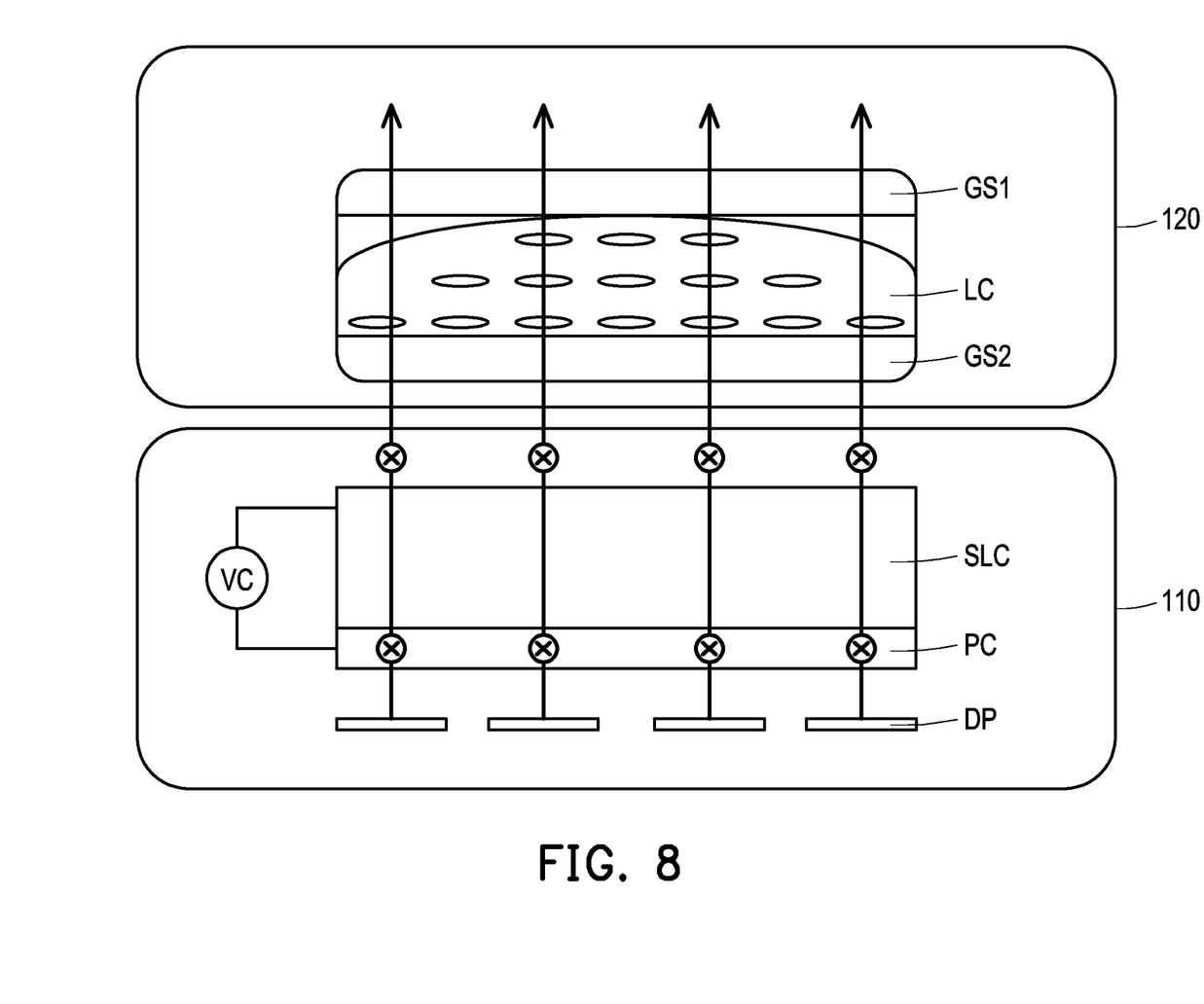
FIG. 8 is a schematic diagram of a portion of the structure of a stereoscopic display device according to an embodiment of the invention.

FIG. 8 is a schematic diagram of a portion of the structure of a stereoscopic display device according to an embodiment of the invention. The display panel 110 and/or the lens array 120 shown in FIG. 8 may be used as an implementation example of the display panel 110 and/or the lens array 120 in the stereoscopic display device 100 shown in FIG. 1 and FIG. 2, or as an implementation example of the display panel 110 and/or the lens array 120 in the stereoscopic display device 200 shown in FIG. 7. In the embodiment shown in FIG. 8, the display panel 110 may include a switching liquid crystal layer SLC, a polarized coating PC, and a plurality of display pixels DP sequentially disposed in an overlapping manner. The lens array 120 may include a glass substrate GS1, a liquid crystal layer LC, and a glass substrate GS2 sequentially disposed in an overlapping manner. The liquid crystal rotation angle of the liquid crystal layer LC in the lens array 120 may be adjusted to change the light transmission direction of the image displayed by the display pixels DP. In particular, the implementation of each element may be constructed by a stereoscopic display device known to those with ordinary skill in the art, and the present embodiment is not limited in this regard.

Based on the above, the stereoscopic display devices 100 and 200 of the embodiments of the invention may acquire the sensed image I2 of the viewing field FD of the display panel 110 via the image sensor 130, and calculate the actual eye position $X_E$ of the user in the viewing field FD according to the reference position Cs and the eye position $C_G$ in the sensed image I2 via the processing circuit 140, so as to adjust the liquid crystal rotation angle of the lens array 120 according to the actual eye position $X_E$. In this way, the viewing position of the three-dimensional image I1 displayed by the display panel 110 may match the actual eye position $X_E$, thereby optimizing user experience.

Although the invention has been described with reference to the above embodiments, it will be apparent to one of ordinary skill in the art that modifications to the described embodiments may be made without departing from the spirit of the disclosure. Accordingly, the scope of the disclosure is defined by the attached claims not by the above detailed descriptions.

What is claimed is:

1. A stereoscopic display device, comprising:
   a display panel configured to display a three-dimensional image;
   a lens array disposed on a transmission path of the three-dimensional image;
   an image sensor configured to acquire a sensed image of a viewing field of the display panel; and
   a processing circuit coupled to the lens array and the image sensor, wherein the processing circuit calculates an actual eye position of a user in the viewing field according to reference coordinates of a reference position in the sensed image and eye coordinates of the user in the sensed image, adjusts a liquid crystal rotation angle of the lens array according to the actual eye position to change a direction of light refraction, so that a viewing position of the three-dimensional image is moved from a default viewing position corresponding to the reference coordinates in the viewing field to the actual eye position.

2. The stereoscopic display device of claim 1, wherein the reference position comprises a center position of the sensed image.

3. The stereoscopic display device of claim 1, wherein the processing circuit calculates a spatial transformation matrix according to the reference coordinates and the default viewing position corresponding to the reference coordinates in the viewing field.

4. The stereoscopic display device of claim 1, wherein the processing circuit converts the eye coordinates to the actual eye position using a spatial transformation matrix.

5. The stereoscopic display device of claim 1, wherein the processing circuit calculates a rotation matrix according to the default viewing position corresponding to the reference coordinates in the viewing field and the actual eye position, and calculates the liquid crystal rotation angle according to the rotation matrix.

6. The stereoscopic display device of claim 1, further comprising:
   a depth sensor configured to sense a depth information from the display panel to the user in the viewing field, wherein the processing circuit calculates the default viewing position corresponding to the reference coordinates in the viewing field using the depth information and the reference coordinates.

7. The stereoscopic display device of claim 1, wherein the lens array comprises a first lens array and a second lens array respectively corresponding to a left eye and a right eye of the user, and the processing circuit adjusts the liquid crystal rotation angle of the first lens array and the liquid crystal rotation angle of the second lens array according to the actual eye position and a compensation vector.

8. The stereoscopic display device of claim 7, wherein the compensation vector is related to a horizontal resolution of the display panel.

9. A display method of a stereoscopic display device, comprising:
   displaying a three-dimensional image via a display panel of the stereoscopic display device;
   disposing a lens array of the stereoscopic display device on a transmission path of the three-dimensional image;
   acquiring a sensed image of a viewing field of the display panel via an image sensor of the stereoscopic display device;
   calculating an actual eye position of a user in the viewing field according to reference coordinates of a reference position in the sensed image and eye coordinates of the user in the sensed image via a processing circuit of the stereoscopic display device; and
   adjusting a liquid crystal rotation angle of the lens array according to the actual eye position via the processing circuit to change a direction of light refraction, so that a viewing position of the three-dimensional image is moved from a default viewing position corresponding to the reference coordinates in the viewing field to the actual eye position.

10. The display method of claim 9, wherein the reference position comprises a center position of the sensed image.

11. The display method of claim 9, further comprising:
    calculating a spatial transformation matrix according to the reference coordinates and the default viewing position corresponding to the reference coordinates in the viewing field via the processing circuit.

12. The display method of claim 9, further comprising:
    converting the eye coordinates to the actual eye position using a spatial transformation matrix via the processing circuit.

13. The display method of claim 9, further comprising:
    calculating a rotation matrix according to the default viewing position corresponding to the reference coordinates in the viewing field and the actual eye position via the processing circuit; and
    calculating the liquid crystal rotation angle according to the rotation matrix via the processing circuit.

14. The display method of claim 9, further comprising:
    sensing a depth information from the display panel to the user in the viewing field via a depth sensor of the stereoscopic display device; and
    calculating the default viewing position corresponding to the reference coordinates in the viewing field using the depth information and the reference coordinates via the processing circuit.

15. The display method of claim 9, wherein the lens array comprises a first lens array and a second lens array respectively corresponding to a left eye and a right eye of the user, and the display method further comprises:
    adjusting the liquid crystal rotation angle of the first lens array and the liquid crystal rotation angle of the second lens array according to the actual eye position and a compensation vector via the processing circuit.

16. The display method of claim 15, wherein the compensation vector is related to a horizontal resolution of the display panel.

* * * * *